(12) United States Patent
Basilio et al.

(10) Patent No.: US 8,052,837 B2
(45) Date of Patent: Nov. 8, 2011

(54) DEINKING OF WASTE PAPER

(75) Inventors: Cesar I. Basilio, Milledgeville, GA (US); Steven W. Sheppard, Sandersville, GA (US)

(73) Assignee: Thiele Kaolin Company, Sandersville, GA (US)

( * ) Notice: Subject to any disclaimer, the term of this patent is extended or adjusted under 35 U.S.C. 154(b) by 305 days.

(21) Appl. No.: 11/451,295

(22) Filed: Jun. 12, 2006

(65) Prior Publication Data

US 2007/0284067 A1 Dec. 13, 2007

(51) Int. Cl.
*D21B 1/08* (2006.01)

(52) U.S. Cl. .......................................... 162/4

(58) Field of Classification Search .................. 162/4, 5, 162/109, 111, 158; 510/174, 504; 424/63, 424/590
See application file for complete search history.

(56) References Cited

U.S. PATENT DOCUMENTS

| | | | |
|---|---|---|---|
| 1,421,195 A | 6/1922 | Eyrich et al. |
| 3,764,460 A | 10/1973 | Miyamoto et al. |
| 4,013,505 A | 3/1977 | Balcar et al. |
| 4,360,439 A | 11/1982 | Calmanti et al. |
| 4,421,195 A | 12/1983 | Aiba |
| 4,483,741 A | 11/1984 | Maloney et al. |
| 4,605,773 A | 8/1986 | Maloney et al. |
| 4,964,949 A | 10/1990 | Hamaguch et al. |
| 5,151,155 A | 9/1992 | Cody et al. |
| 5,225,046 A | 7/1993 | Borchardt |
| 5,227,019 A | 7/1993 | Borchardt |
| 5,288,369 A | 2/1994 | Ishibashi et al. |
| 5,308,448 A | 5/1994 | Behler et al. |
| 5,336,372 A | 8/1994 | Cody et al. |
| 5,362,363 A | 11/1994 | Smolka et al. |
| 5,540,814 A | 7/1996 | Curtis et al. |
| 5,725,730 A | 3/1998 | Smolka et al. |
| 5,736,622 A | 4/1998 | Wallberg et al. |
| 5,801,135 A | 9/1998 | Miyauchi et al. |
| 5,882,476 A | 3/1999 | Evans et al. |
| 6,103,687 A | 8/2000 | Cody et al. |
| 6,159,381 A | 12/2000 | Bleakley et al. |
| 6,210,526 B1 | 4/2001 | Pohlen |
| 6,251,220 B1 | 6/2001 | Irinatsu et al. |
| 6,458,343 B1 | 10/2002 | Zeman et al. |
| 2002/0066880 A1 | 6/2002 | Robinson et al. |
| 2004/0065419 A1 | 4/2004 | Lasmarias et al. |
| 2005/0098278 A1 | 5/2005 | Rosencrance et al. |
| 2005/0133172 A1 | 6/2005 | Robinson et al. |
| 2007/0158039 A1 | 7/2007 | Rosencrance et al. |

FOREIGN PATENT DOCUMENTS

| | | | |
|---|---|---|---|
| JP | 10-88489 | * | 7/1998 |
| WO | 9105905 | | 5/1991 |

OTHER PUBLICATIONS

"Interfacial Chemistry Aspects of De-Inking Flotation of Mixed Office Paper"; Drelich et al; Paper presented at the Annual Meeting of the Society of Mining, Metallurgy and Exploration, in Denver, Colorado during Feb. 26-28, 2001.
"Advances in Deinking Surfactant Chemistry for Onp/Omg Systems"; Horeck & Luo; Paper Age Magazine; Jul. 2001 issue.
Smook, Handbook for Pulp & Paper Technologists; 2nd Edition; Angus Wilde Publications; 1992; p. 227.
Murray, "Overview-clay mineral applications", Applied Clay Science, vol. 5, pp. 379-395 (1991).
Janczuk et al., "Influence of Exchangeable Cations . . . ", Clays and Clay Minerals, vol. 37, No. 3. pp. 269-272 (1989).
Chiang et al., "Interfacial Properties of Lignite, Graphite, Kaolin, and Pyrite", ACS Fuels Symposium (Los Angeles), vol. 33, No. 4, pp. 777-788 (1988).
Willis et al., "Kaolin Flotation: Beyond the Classical", Advances in Flotation Technology, Society for Mining, Metallurgy, and Exploration, Inc., pp. 219-229 (1999).
Palomino et al., "Mixtures of Fine-Grained Minerals—Kaolinte and Carbonate Grains", Clays and Clay Minerals, vol. 56, No. 6, pp. 599-611 (2008).
Wang et al, "A Study of Carrier Flotation", International Symposium on Fine Particles Processing (Las Vegas), American Institute of Mining . . . , Inc., p. 1112-1128 (1980).

\* cited by examiner

*Primary Examiner* — Mark Halpern

(74) *Attorney, Agent, or Firm* — Baker, Donelson, Bearman, Caldwell & Berkowitz PC

(57) ABSTRACT

Waste paper is deinked by a composition which comprises a surfactant and a hydrophobic-based deinking component.

7 Claims, No Drawings

DEINKING OF WASTE PAPER

TECHNICAL FIELD

The present invention relates to the deinking of waste paper. In a more specific aspect, this invention relates to the use of a mineral-based deinking component for the deinking of waste paper.

This invention also relates to a process for the deinking of waste paper.

BACKGROUND OF THE INVENTION

Deinked pulp has become a principal source of raw material for making paper in applications such as newsprint and tissue production. The deinking process has evolved throughout the years to provide for the removal of ink from recycled paper. In conventional paper recycling processes, deinking is carried out by converting the waste paper, such as old newspaper, old magazines and mixed office waste, to a pulp and then contacting the pulp with an alkali for pH modification and swelling of the fiber and a surfactant to stabilize the ink particles and reduce reattachment of the ink particles to the fiber. The ink particles and other impurities from the pulp fiber are then released and separated.

The current deinking processes employed in separating the ink from the fiber in waste paper include wash deinking, flotation deinking or a combination of both methods. Flotation deinking involves the interaction between the ink particles, air bubbles and the fibers. The ink particles which are typically rendered hydrophobic by a deinking surfactant attach to the air bubble surfaces and float upwards towards the top of the flotation device. Under typical conditions, the fiber will remain hydrophilic and will neither attach to the air bubbles nor float during the flotation process. In the case of wash deinking, the ink particles are kept well dispersed in the aqueous phase by surfactants. The ink particles are separated from the fibers by a repeated flow of water passing by the fibers through a screen. This wash deinking technology involves multiple dilution and thickening stages.

In deinking, the surfactants used are either fatty acids, synthetic surfactants such as alkoxylates or blends of these two surfactant types. Fatty acids are well known flotation agents used in both mineral and non-mineral applications. The use of synthetic surfactants such as alkylamine polyethers as deinking aids is described in U.S. Pat. Nos. 4,483,741 and 4,605,773. The use of a blend of fatty acid and alkylene oxide as a deinking agent is described in U.S. Pat. No. 4,964,949.

Another synthetic surfactant blend used in flotation deinking is a polyester obtained through the reaction between polyalkylene glycol, carboxylic acid and/or anhydrides and saturated fatty acids, as described in U.S. Pat. No. 5,736,622.

U.S. Pat. Nos. 5,227,019; 5,225,046; 5,725,730 and 5,801,135 disclose the use of fatty acids with alkoxylated fatty alcohols. A flotation deinking method using alkylene oxide, oil, fat and alcohol is described in U.S. Pat. No. 6,251,220.

U.S. Pat. Nos. 5,151,155 and 5,336,372 describe a deinking process wherein organically modified smectite clay is used.

U.S. Pat. No. 5,540,814 describes a method for removing ink and reducing stickies from waste paper by using cationic kaolin clay and a centrifugal cleaner.

Due to the limitations of these different deinking processes to separate the ink particles from the fiber obtained from waste paper, there is a need in the industry to develop a process that is more efficient and cost effective.

SUMMARY OF THE INVENTION

The present invention provides a mineral-based deinking component for use in the deinking of waste paper by wash deinking, flotation deinking or a combination of these methods.

The present invention also provides a process for the deinking of waste paper in which a mineral-based deinking component is used.

In the present invention, the increased interaction of the mineral-based deinking component with the ink particles results in an increased efficiency of the deinking process over other methods such as those methods utilizing deinking surfactants alone.

In the present invention, the mineral-based deinking component is prepared by treating the mineral particles with hydrophobizing reagents and then separating the hydrophobic mineral particles from the non-hydrophobic mineral particles. Only the particles that are hydrophobic are used in this invention, unlike the prior art that uses the entire treated particles without regard to their surface property. The hydrophobic nature of these surface-modified mineral particles improves their attachment to the ink particles, resulting in improved separation of the ink particles from the fibers of the waste paper.

In addition, the ink particles in this invention are separated from the paper fibers using flotation deinking, wash deinking or a combination thereof as compared to the prior art that relies on a gravity-type separator or a centrifugal device for separation.

For purposes of this application, the term "deinking" will be understood to refer to the treatment of waste paper so that the ink particles, or at least a substantial amount of the ink particles, are separated from the waste paper which can then be recycled for future use.

These and other objects, features and advantages of this invention will become apparent from the following detailed description.

DETAILED DESCRIPTION OF THE INVENTION

In accordance with the present invention, the mixtures of mineral particles are first dispersed into a slurry form and then mixed with a hydrophobizing agent to modify the surface of the mineral particles.

The minerals that are used in this invention are silicate minerals such as kaolinite, talc, quartz, mica, potash, kyanite, phosphate, zircon, smectite-type clay or feldspar; oxide minerals such as anatase, rutile, ilmenite, cassiterite, chromite or iron oxides; carbonates such as calcite, magnesite or dolomite, nonmetallic minerals such as barite, sylvite or halite; or sulfide minerals such as pyrite, chalcopyrite, chalcocite or galena. A mixture of minerals can be used in this invention.

The hydrophobizing agents that may be used to prepare the surface-modified mineral particles include but are not limited to sulfhydryls, carboxylic acids, amines, oil, sulfonates, hydroxamates, fatty acids, siloxanes and blends thereof. The hydrophobized mineral particles are then concentrated and separated from the non-hydrophobized mineral particles. Methods of separating the hydrophobized minerals include flotation and selective flocculation. In the case of flotation, the conditioned minerals are then transferred to a flotation cell and floated. The hydrophobized mineral particles can then be used in this invention as deinking aids for improving the deinking process compared to that using a deinking surfactant alone.

The basic steps in a deinking process involve the following: repulping the waste paper, coarse cleaning and screening, flotation and/or wash deinking, fine cleaning and screening and then bleaching.

In the repulping stage, the waste paper is usually treated in aqueous alkaline conditions with chemicals such as sodium hydroxide, sodium silicate and hydrogen peroxide. The repulping stage may also be conducted at neutral pH conditions by minimizing the addition of the alkali chemicals or using soda ash instead. The deinking surfactant and the deinking component of this invention are typically added at this stage, although these components may be added later just prior to the actual separation of the ink stage (i.e., washing or flotation). This step is then followed by coarse cleaning or screening to remove the relatively coarse contaminants such as staples, plastic, etc. from the pulp. The pulp is then processed by well-known wash deinking, flotation deinking or a combination of both.

The mixtures of minerals used as the deinking component can be any of the minerals listed previously; however, crude kaolin clay will be used to describe the process of this invention. Crude kaolin clay generally contains kaolinite and other related hydrated aluminum silicate minerals as well as quartz, mica, titanium dioxide and iron oxide minerals.

To produce the surface modified kaolin clay deinking component, the starting crude kaolin clay is initially dispersed by blunging the clay with water in the presence of a dispersant at dosages ranging from about 1 to about 25 pounds per ton of dry solids. Effective dispersants include sodium silicate, sodium metasilicate, sodium hexametaphosphate, and sodium polyacrylate. The preferred dispersant for this invention is sodium silicate using dosages ranging from about 2 to about 16 pounds per ton. The pH is adjusted to a range of about 5 to about 11, preferably about 7 to about 10, using a pH modifier such as sodium hydroxide, sodium carbonate or ammonium hydroxide.

The dispersed kaolin clay slurry is then mixed with hydrophobizing agents such as an alkyl hydroxamate, fatty acid, siloxane and combinations thereof. The amount of hydrophobizing reagent added to the dispersed kaolin slurry must be sufficient to hydrophobize the crude kaolin clay. The hydrophobizing agent additions used are in the range of about 0.2 to about 10 pounds per ton of dry clay, preferably about 0.5 to about 5 pounds per ton.

After mixing with the hydrophobizing reagent, the kaolin slurry is then transferred to a froth flotation cell and, if necessary, diluted to a pulp density preferably within the range of about 15 to about 45% solids by weight. A frother, which is generally a heteropolar surface active organic reagent, may be added if necessary to stabilize the air bubbles. The amount of frother added depends on the type of frother used and the amount of the kaolin feed material. The frothers that can be used include alcohols, amines, alkoxy compounds and polyglycol compounds.

The preferred frothers for this invention are methyl isobutyl carbinol, ethyl hexanol, pine oil and polypropylene glycol. The frother dosage for effective flotation ranges from about 0.01 to about 2 pounds per ton, preferably about 0.05 to about 1 pound per ton. The operation of the froth flotation machine is conducted in conventional fashion. After an appropriate period of operation, the hydrophobized kaolin clay materials are concentrated in the froth phase and collected.

In the production of the hydrophobized surface-modified mineral particles for the present invention, the froth flotation process can be conducted either in a mechanical or pneumatic machine. A typical pneumatic machine that can be used is a flotation column, while a typical mechanical machine is an impeller driven flotation machine. The hydrophobized material in this invention can also be produced by flotation through the use of other flotation processes such as dissolved air flotation, induced air flotation, bulk oil flotation, skin flotation or table flotation.

The hydroxamate agent used in the present invention is a hydroxamate compound, or a mixture of such compounds, having the general formula:

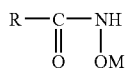

in which R is an alkyl, aryl or alkylaryl group having 4 to 28 carbon atoms, and M is hydrogen, an alkali metal or an alkaline earth metal.

Examples of suitable R groups include butyl, hexyl, octyl, dodecyl, lauryl, 2-ethylhexyl, oleyl, eicosyl, phenyl, tolyl, naphtyl and hexylphenyl.

Examples of suitable alkali metals are lithium, sodium and potassium.

Examples of suitable alkaline earth metals are magnesium, calcium and barium.

Examples of the hydroxamates which are useful in the process of the present invention include potassium butyl hydroxamate, potassium octyl hydroxamate, potassium lauryl hydroxamate, potassium 2-ethylhexyl hydroxamate, potassium oleyl hydroxamate, potassium eicosyl hydroxamate, potassium phenyl hydroxamate, potassium naphtyl hydroxamate, potassium hexylphenyl hydroxamate, and the corresponding salts of sodium and other alkali or alkaline earth metals. The salts can be converted to the corresponding acids by those skilled in the art. These hydroxamate compounds can be prepared by well-known methods.

In this invention, the fatty acid used has the general formula:

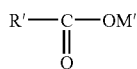

in which R' is an alkyl, aryl or alkylaryl group having 1 to 26 carbon atoms, and M' is hydrogen, an alkali metal or an alkaline earth metal.

Examples of suitable R' groups include methyl, ethyl, butyl, octyl, lauryl, 2-ethylhexyl, oleyl, eicoseyl, phenyl, naphtyl and hexylphenyl.

Examples of suitable alkali metals are lithium, sodium and potassium.

Examples of suitable alkaline earth metals are magnesium, calcium and barium.

The siloxanes used in the present invention are organosilane compounds containing a silicon to carbon bond. Examples of suitable siloxanes include hexamethyldisiloxane, hexamethylytrisiloxane, disiloxane, vinylheptamethyltrisiloxane, octamethyltrisiloxane, tetramethyldisiloxane, and tetravinyldimethyldisiloxane.

The silicones used in the present invention have the general formula:

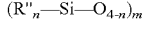

in which R" is vinyl, hydrogen or an alkyl, aryl, or alklaryl group having 1-26 carbon atoms, n is between 0 to 3 and m is 2 or larger.

Examples of suitable R" include methyl, ethyl, butyl, octyl, lauryl, 2-ethylhexyl, oleyl, eicoseyl, phenyl, naphtyl, hexylphenyl, vinyl and hydrogen.

Examples of silicones which are useful in the process of the invention include polydimethylsiloxanes, polymethylhydrosiloxanes, polyethylhydrosiloxanes and polymethylalkylsiloxanes.

The surfactants used in the composition of this invention are well-known in the industry and include ionic, non-ionic and cationic surfactants.

The present invention is further illustrated by the following examples which are illustrative of certain embodiments designed to teach those of ordinary skill in this art how to practice this invention and to represent the best mode contemplated for carrying out this invention.

Example 1

A sample of kaolin clay from Washington County, Georgia was hydrophobized and separated from the non-hydrophobized kaolin clay using the following procedure. 2000 dry grams of crude kaolin clay sample were blunged using a high speed mixer. Blunging of the clay was conducted at 60% solids using 2.4 pounds sodium silicate per ton of dry clay and 1.6 pounds sodium hydroxide per ton of dry clay. This dispersed kaolin clay was then hydrophobized with the following hydrophobizing reagents: 1 pounds alkyl hydroxamate per ton of dry clay, 1 pounds tall oil per dry ton of clay and 0.5 pound calcium chloride per dry ton of clay as activator for tall oil. The hydrophobized material was diluted to 25% solids with water and then transferred to a Denver D-12 flotation cell. The slurry was then floated and the hydrophobized material was then collected in the froth phase. The material was then dewatered to remove some of the water present in the collected slurry. The hydrophobized kaolin clay material produced in this example is used as the deinking aid in Examples 2-6.

Example 2

The flotation deinking test procedure used in this work is as follows. Various old newsprint (ONP) from the Macon Telegraph, Wall Street Journal and USA Today newspaper was shredded. 300 gm of ONP was mixed with hot tap water to 5% solids with the following chemicals added: 2 pound calcium chloride per dry ton of ONP, 2 pound sodium silicate per dry ton of ONP, deinking surfactant and sodium hydroxide to adjust the pH of the slurry to about pH 9 to 10. The deinking aid produced in Example 1 is added here together with the other chemicals. The sample was pulped for 10 minutes in a Formax Maelstrom Laboratory Pulper. After pulping, the sample was diluted to 1% solids and floated in a Denver cell for five minutes. After flotation, the accepts containing the deinked fiber was collected and its brightness measured. Brightness measurement was conducted by forming the deinked pulp into a pad, oven dried, and the GE brightness measured using TAPPI Test Method T-218.

The conventional technology uses a deinking surfactant only. In this example, 5 pounds of LionSurf 850 deinking surfactant per dry ton of ONP was used. (LionSurf 850 is a non-ionic polyalkylene oxide based surfactant commercially available from Vinings Industries.) The process of this invention used 5 pounds of deinking aid produced in Example 1 per dry ton of ONP in addition to the 5 pounds of LionSurf 850 deinking surfactant per dry ton of ONP. The results of the deinking tests given in Table 1 show that the addition of the hydrophobized kaolin clay deinking aid of this invention resulted in higher brightness of the deinked pulp.

TABLE 1

| | Flotation Accepts Brightness | | |
|---|---|---|---|
| Sample | LionSurf 850 | LionSurf 850 + Deinking Aid | Brightness Gain |
| Macon Telegraph | 46.7 | 48.2 | +1.5 |
| Wall Street Journal | 49.8 | 50.8 | +1.0 |
| USA Today | 49.1 | 50.1 | +1.0 |
| Blend (1:1:1)* | 46.1 | 47.6 | +1.5 |

*Blend containing equal amounts of ONP from Macon Telegraph, Wall Street Journal and USA Today.

Example 3

The flotation deinking test procedure used in Example 2 was repeated on an ONP blend containing equal amounts of waste paper from the Macon Telegraph, Wall Street Journal and USA Today newspaper. The conventional technology uses a deinking surfactant only. In this example, 7.5 pounds of LionSurf 850 deinking surfactant per dry ton of ONP was used. However, the process of this invention used 3.75 pounds of deinking aid produced in Example 1 per dry ton of ONP in addition to the 3.75 pounds of LionSurf 850 deinking surfactant per dry ton of ONP. The results given in Table 2 show that replacing half of the deinking surfactant with the hydrophobized kaolin clay deinking aid show an increase in the brightness of the deinked pulp. An improvement in deinking was obtained even though half of the deinking surfactant was replaced by an equivalent amount of the more cost effective deinking aid of this invention.

TABLE 2

| | Flotation Accepts Brightness | | |
|---|---|---|---|
| Sample | LionSurf 850 | LionSurf 850 + Deinking Aid | Brightness Gain |
| Macon Telegraph | 46.7 | 48.2 | +1.5 |
| Wall Street Journal | 49.8 | 50.8 | +1.0 |
| USA Today | 49.1 | 50.1 | +1.0 |
| Blend (1:1:1)* | 46.1 | 47.6 | +1.5 |

Example 4

Another flotation deinking test was conducted using the flotation deinking test procedures used in Example 2. The test used an ONP blend containing equal amounts of waste paper from the Macon Telegraph, Wall Street Journal and USA Today newspaper. The conventional technology used 7.5 pounds of Buckman 2349 flotation deinking surfactant per dry ton of ONP while the process of this invention used 3.75 pounds of deinking aid produced in Example 1 per dry ton of ONP and 3.75 pounds of Buckman 2349 flotation deinking surfactant per dry ton of ONP. (Buckman 2349 is a surfactant commercially available from Buckman Laboratories and contains ethoxylated propoxylated C16-18 alcohols.) Table 3 shows that replacing half of the deinking surfactant with the hydrophobized kaolin clay deinking aid results in an increase in the brightness of the deinked pulp. An improvement in deinking was obtained even though half of the deinking surfactant was replaced by an equivalent amount of the more cost effective deinking aid of this invention.

TABLE 3

| | Flotation Accepts Brightness | | |
|---|---|---|---|
| Sample | Buckman 2349 | Buckman 2349 + Deinking Aid | Brightness Gain |
| Blend (1:1:1)* | 46.3 | 47.6 | +1.3 |

*Blend containing equal amounts of ONP from Macon Telegraph, Wall Street Journal and USA Today.

Example 5

In the case of the wash deinking test, the following procedure was used in this work. Various old newsprint (ONP) from the Macon Telegraph, Wall Street Journal and USA Today newspaper was shredded. 300 gm of ONP was mixed with hot tap water to 5% solids with the following chemicals added: 2 pound calcium chloride per dry ton of ONP, 2 pound sodium silicate per dry ton of ONP, deinking surfactant, and sodium hydroxide to adjust the pH of the slurry to about pH 9 to 10. The deinking aid produced in Example 1 is added here together with the other chemicals. The sample was pulped for 10 minutes in a Formax Maelstrom Laboratory Pulper. After pulping, the sample was diluted to 1% solids and washed through a 325 mesh screen. The fiber remaining on the screen, which is the "accepts", is made into a pad and the brightness of the pad is measured afterwards.

For the conventional technology, 5 pounds of LionSurf 850 deinking surfactant per dry ton of ONP was used. The process of this invention used 5 pounds of the deinking aid produced in Example 1 per dry ton of ONP and 5 pounds of LionSurf 850 deinking surfactant per dry ton of ONP. The results of the washing deinking tests are shown in Table 4. The use of the hydrophobized kaolin clay deinking aid of this invention resulted in higher brightness of the deinked pulp.

TABLE 4

| | Washing Accepts Brightness | | |
|---|---|---|---|
| Sample | LionSurf 850 | LionSurf 850 + Deinking Aid | Brightness Gain |
| Macon Telegraph | 44.4 | 48.3 | +3.9 |
| Wall Street Journal | 41.9 | 43.8 | +1.9 |
| USA Today | 48.2 | 50.3 | +2.1 |
| Blend (1:1:1)* | 45.4 | 50.2 | +4.8 |

*Blend containing equal amounts of ONP from Macon Telegraph, Wall Street Journal and USA Today.

Example 6

The procedure used for wash deinking test used in Example 6 was repeated using 5 pounds of Buckman 2317 deinking surfactant per dry ton of ONP was used. (Buckman 2317 is a surfactant commercially available from Buckman Laboratories and is a glycol ether-based wash deinking surfactant.) For the process of this invention, 5 pounds of Buckman 2317 deinking surfactant per dry ton of ONP together with 2.5 pounds of deinking aid produced in Example 1 per dry ton of ONP was used. The wash deinking test results are presented in Table 5. As shown, the hydrophobized kaolin clay deinking aid of this invention gives improved deinking of ONP.

TABLE 5

| | Washing Accepts Brightness | | |
|---|---|---|---|
| Sample | Buckman 2317 | Buckman 2317 + Deinking Aid | Brightness Gain |
| Blend (1:1:1)* | 46.8 | 48.7 | +1.9 |

*Blend containing equal amounts of ONP from Macon Telegraph, Wall Street Journal and USA Today.

This invention has been described in detail with particular reference to certain embodiments, but variations and modifications can be made without departing from the spirit and scope of the invention as defined in the following claims.

What is claimed is:

1. A process for deinking waste paper, wherein the process comprises:
   A. treating the waste paper with a composition which comprises a surfactant and a hydrophobic kaolin-based deinking component produced by a process comprising the following steps:
      (1) forming a dispersed kaolin clay slurry by blunging a crude kaolin clay with water in the presence of a dispersant;
      (2) mixing the dispersed kaolin clay slurry with a hydrophobizing reagent to produce a hydrophobic kaolin-based deinking component and a non-hydrophobic kaolin-based component; and
      (3) separating the hydrophobic kaolin-based deinking component from the non-hydrophobic kaolin-based component, and
   B. subjecting the treated waste paper to wash deinking or flotation deinking.

2. A process as defined by claim 1 wherein the surfactant is ionic, cationic, non-ionic or a blend thereof.

3. A process as defined by claim 1 wherein the deinking component contains a silicate, oxide, carbonate, nonmetallic, sulfide or a mixture thereof.

4. A process as defined by claim 1 wherein the surfactant is a non-ionic polyalkylene oxide based surfactant.

5. A process as defined by claim 1 wherein the hydrophobizing reagent is a sulfhydryl, carboxylic acid, amine, oil, sulfonate, hydroxamate, fatty acid, siloxane or a blend thereof.

6. A process for producing a hydrophobic kaolin-based deinking component, wherein the process comprises the following steps:
   (1) forming a dispersed kaolin clay slurry by blunging a crude kaolin clay with water in the presence of a dispersant;
   (2) mixing the dispersed kaolin clay slurry with a hydrophobizing reagent to produce a hydrophobic kaolin-based deinking component and a non-hydrophobic kaolin-based component; and
   (3) separating the hydrophoblic kaolin-based deinking component from the non-hydrophobic kaolin-based component.

7. A process as defined by claim 6 wherein the hydrophobizing reagent is a sulfhydryl, carboxylic acid, amine, oil, sulfonate, hydroxamate, fatty acid, siloxane or a blend thereof.

* * * * *